(12) United States Patent
Sheaffer et al.

(10) Patent No.: US 7,958,671 B2
(45) Date of Patent: Jun. 14, 2011

(54) PLANT CONTAINER

(75) Inventors: Daniel E. Sheaffer, Findlay, OH (US); William P. Camp, Jr., Vanlue, OH (US)

(73) Assignee: Garden-Aire, LLC, Findlay, OH (US)

( * ) Notice: Subject to any disclaimer, the term of this patent is extended or adjusted under 35 U.S.C. 154(b) by 903 days.

(21) Appl. No.: 11/729,690

(22) Filed: Mar. 29, 2007

(65) Prior Publication Data
US 2008/0236040 A1 Oct. 2, 2008

(51) Int. Cl.
*A01G 9/02* (2006.01)
(52) U.S. Cl. ............................. 47/68; 47/65.5; 47/66.1
(58) Field of Classification Search ............. 47/86, 66.1, 47/66.5, 66.6, 68, 65.5, 71; 248/309.1, 311.2, 248/230.1
See application file for complete search history.

(56) References Cited

U.S. PATENT DOCUMENTS

| | | | |
|---|---|---|---|
| D348,028 S | 6/1994 | Sheaffer | |
| 6,161,333 A * | 12/2000 | Poston | 47/86 |
| 6,269,589 B1 | 8/2001 | Bouler | |
| 6,612,072 B2 * | 9/2003 | Busby et al. | 47/65.8 |
| 6,752,279 B1 | 6/2004 | Dwyer | |
| 6,862,843 B2 * | 3/2005 | Missry | 47/66.6 |
| 7,013,602 B2 * | 3/2006 | Weder | 47/72 |
| 2004/0006913 A1 * | 1/2004 | Jordan | 47/86 |

* cited by examiner

*Primary Examiner* — Kimberly S Smith
*Assistant Examiner* — Monica Williams
(74) *Attorney, Agent, or Firm* — MacMillan, Sobanski & Todd, LLC (57) ABSTRACT

A semi-circular flexible flower box (top section) and a semi-circular flexible mounting shelf (bottom section), are both functional companion units. The top section functions as a flower box but has a flexible accordion pleat (inside/outside diameters) configured in a semi-circle to allow for attachment to cylindrical objects. The bottom section functions as a mounting shelf for the top section and is structured not only in the same flexible semi-circular fashion, but is designed in such a way as to capture the flower box section allowing it to rest securely on the mounting shelf or bottom section. Configured to the inside or backside diameter of the mounting shelf are slots that allow for insertion of an attachment strap. The attachment strap allows for a precise and snug fit of the mounting shelf and companion flower box, top section to cylindrical objects within the range of the mounting shelf's diameter.

9 Claims, 7 Drawing Sheets

PLANT CONTAINER

RELATED APPLICATIONS

The present application is related to U.S. Pat. No. D348,028, issued Jun. 21, 1994, for ADJUSTABLE RADIAL FLOWER BOX, by Daniel Sheaffer, included by reference herein.

FIELD OF THE INVENTION

The present invention relates to flower boxes and, more particularly, to a flower box that is semi-circular, flexible, and attachable to cylindrical objects.

BACKGROUND OF THE INVENTION

Conventional flower boxes come in a wide variety of sizes for window boxes and for setting on the ground or a patio. They also are in potted containers with various designs and diameters. None of these forms, however, allow for plants or flowers to be suspended at a pleasing height on an object which is cylindrical in form, such as a column, tree trunk, or pole. A semi-circular flower box design would add color and vitality to a wide variety of cylindrical objects including but not limited to trees surrounding a garden at a private home or public structure, (presidential residences, museums, libraries, etc.), posts that support lighting in a public areas or malls, sports arenas and street light posts. Each of these objects is circular in shape and the diameter of each varies. A semi-circular flexible flower box with a semi-circular flexible mounting shelf, solves this problem.

Initially, flower boxes were designed in various geometric shapes to hold plants and flowers. Those flower boxes of radial or circular design and function, to the extent they exist, can not be currently found for sale in garden centers, nursery or other retail outlets. One example however is described in U.S. Pat. No. D348,028.

The prior art radial designed flower box is inherently problematic. Typical flower boxes may weigh as much as 22 pounds, or more. The combined weight of plants, flowers, potting soils, and moisture make it difficult for one individual without assistance to lift a fully planted box to a desired height and then also attach it to an object like a tree or pole. It is possible one individual could attach an empty radial designed box to a circular object first and then fill the box with potting soil, plants, or flowers. The problem with this approach is one of convenience and one of safety. From a convenience perspective an individual planting an empty flower box that may be above the individual's personal reach, may have to use a ladder or step-stool to gain elevated access, while at the same time juggle soil and plants. From a safety perspective planting an empty box above ground can be dangerous if an individual is attempting to handle plants, flowers, or soil while balancing on a ladder or step-stool. It is also desireable to conveniently lower the planter periodically for care and maintenance such as pruning, adding soil, and spraying for pests.

The prior art radial designed flower box also does not allow for excess moisture from watering of plants to be trapped. Instead moisture draining through the flower box drain holes has the tendency to seep onto whatever circular object it is attached to. It is not desirable to have excess water and potentially hazardous fertilizer seeping or leaking from any flower box.

It is therefore an object of the invention to provide a semi-circular flower box that can be suspended and affixed to cylindrical objects.

It is another object of the invention to provide a flower box that is flexible enough to accommodate poles and trees within a range of diameters.

It is a further object of the invention to provide a semi-circular mounting shelf in order to capture and secure the semi-circular flower box within the same range of diameters as the flower box.

SUMMARY OF THE INVENTION

In accordance with the present invention, there is provided a semi-circular and flexible flower box (top unit) and a semi-circular flexible mounting shelf (bottom unit) that are both functional and decorative as companion units. The top unit functions as a flower box but has a flexible accordion pleat (inside and outside diameters) configured in a semi-circle to allow for attachment to cylindrical objects. The mounting shelf functions as a base for the flower box and is structured not only in the same flexible semi-circular fashion, but does so in such a way as to allow for capture of the top unit allowing it to mount securely on the base unit. Configured on the inside or backside diameter of the mounting shelf are slots that allow for insertion of an attachment strap. The attachment strap allows for a precise and snug fit of the mounting shelf to cylindrical objects within the range of the mounting shelf's diameter.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DESCRIPTION OF THE PREFERRED EMBODIMENT

Figure 1:
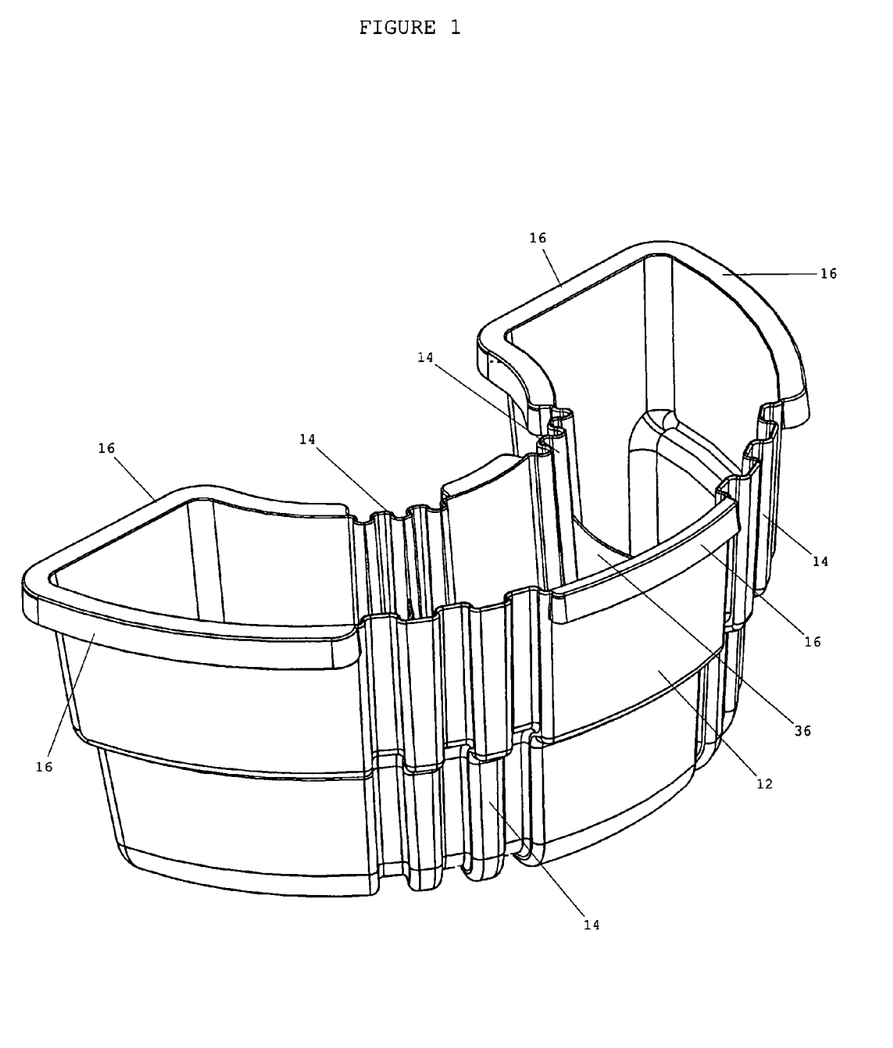
FIG. 1 is a front perspective view of a semi-circular flexible flower box.

FIG. 1 is a front perspective view of a semi-circular flexible flower box 12 in accordance with the invention. The flower box 12 may be fabricated of wood, plastic, metal, or any other suitable material. Moreover, the shape of the flower box 12 is a half circle in the preferred embodiment. The flower box 12 has an accordion pleat 14 in two locations. The accordion pleat 14 locations are centered and equidistant from each other both in the front and back of the flower box 12. The accordion pleat 14 is ribbed both on the outside and inside of the flower box 12. Comprising each accordion pleat 14 on both the front and back of the flower box 12 are two ribs facing outward and three ribs facing inward. Each accordion pleat 14 runs from top to bottom and from back to front of the flower box 12 creating a unified accordion pleat 14. The accordion pleat 14 allows the otherwise rigid flower box 12 to flex within a range of diameters. A structural lip 16 is located on the top outside edges of the flower box 12. This structural lip 16 is not desired on the accordion pleat 14 sections. The structural lip 16 provides additional strength to support the weight of plants and planting materials. On either accordion pleat 14 central rib found on the inside of the flower box 12 is a structural ridge 36. The structural ridge 36 offers additional structural integrity overall to the flower box 12.

Figure 2:
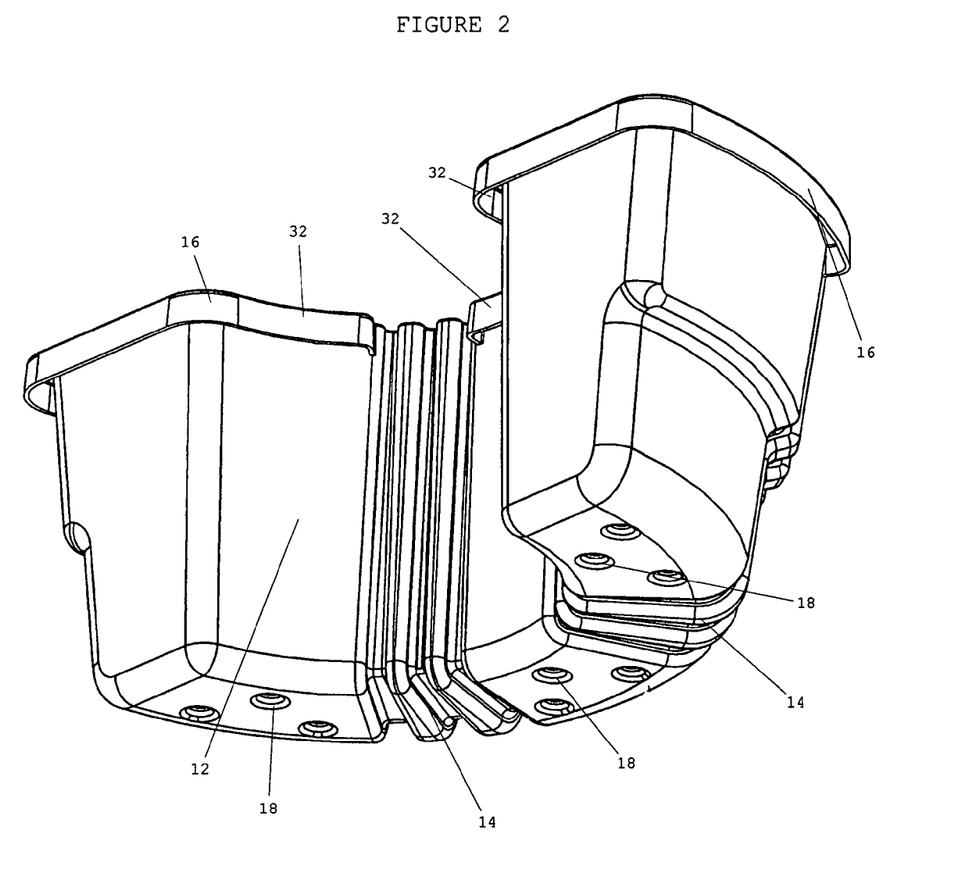
FIG. 2 is a rear perspective bottom up view of a semi-circular flexible flower box.

FIG. 2 is a rear perspective bottom up view of a semi-circular flexible flower box 12 shown in FIG. 1. On the bottom surface there are multiple locations for a separate drainage hole 18. Each drainage hole 18 is circular. Each drainage hole 18 is approximately one quarter inch in diameter and permits access fluid to drain.

Figure 3:
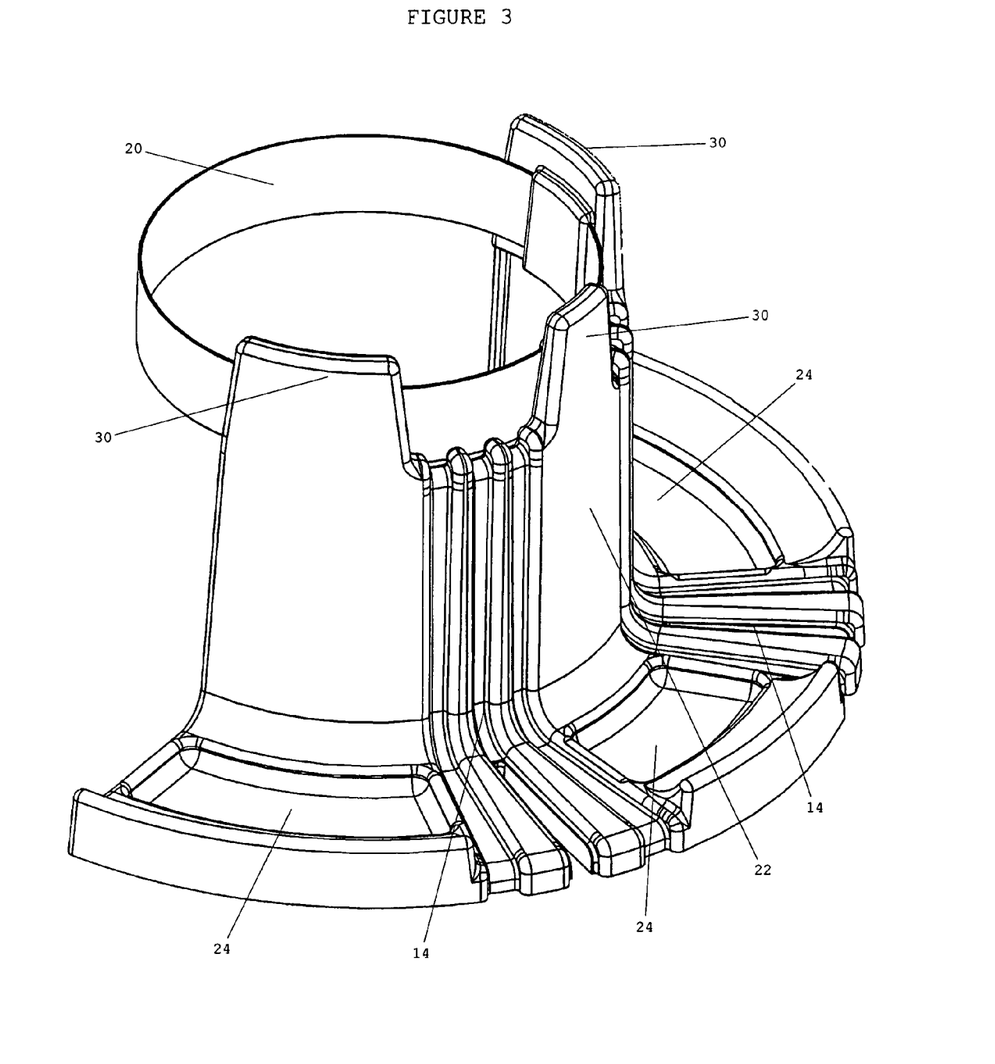
FIG. 3 is a front perspective view of a semi-circular flexible flower box mounting shelf.

FIG. 3 is a front perspective view of a semi-circular flexible mounting shelf 22 in accordance with the invention. The mounting shelf 22 may be fabricated of wood, plastic, metal or any other suitable material. The shape of the mounting shelf 22 is a half circle in the preferred embodiment. The mounting shelf 22 has an accordion pleat 14, centered, two on each side and equidistant from each other. Each accordion pleat 14 is is ribbed both on the outside and inside of the mounting shelf 22. Comprising each accordion pleat 14 on both the front and back of the mounting shelf 22 are two ribs facing outward and three ribs facing inward. Each accordion pleat 14 runs from top to bottom and from back to front of the mounting shelf 22 creating a unified accordion pleat 14. The accordion pleat 14 allows the otherwise rigid mounting shelf 22 to flex within a range of diameters.

Configured on the top of the mounting shelf 22 on the left side, right side, and middle, is a support column 30. Each support column 30 is designed to capture and hold in place the flower box 12 in FIG. 1 matching up with a corresponding column receptor 32 shown in FIG. 2.

Formed in the bottom of the mounting shelf 22 in three locations is a liquid retention bay 24. The locations are left, right, and middle of the mounting shelf 22. Each liquid retention bay 24 aligns with a drainage hole 18 described in FIG. 2.

Figure 4:
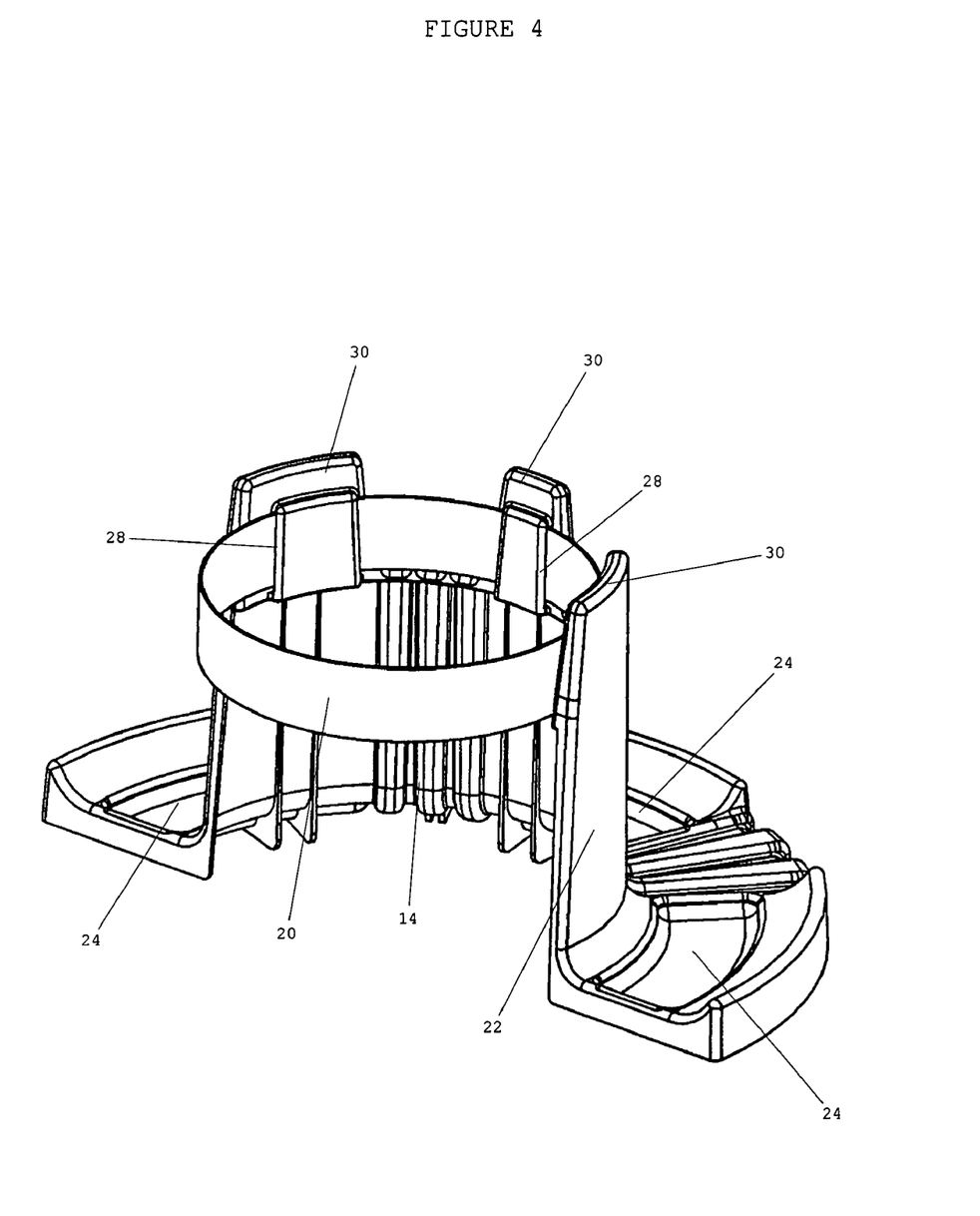
FIG. 4 is a rear perspective view of a semi-circular flexible flower box mounting shelf.

FIG. 4 is a rear perspective view of a semi-circular flexible mounting shelf 22 shown in FIG. 3. On the inside or backside of each support column 30 is an attachment support slot 28. The attachment support slot 28 allows for the insertion of an attachment strap 20. The attachment strap 20 material is composed of nylon, canvas or other similar material. The attachment strap 20 allows for the mounting shelf 22 to be affixed or attached to cylindrical objects within its diametric range. Both ends of the attachment strap 20 are joined together by means of an attachment strap coupling device 34 shown in FIG. 7. The attachment strap coupling device 34 shown in FIG. 7 is currently available and in use on belts, fanny paks, book bags, etc. and allow for the mounting shelf 22 to become securely affixed to cylindrical objects.

Figure 5:
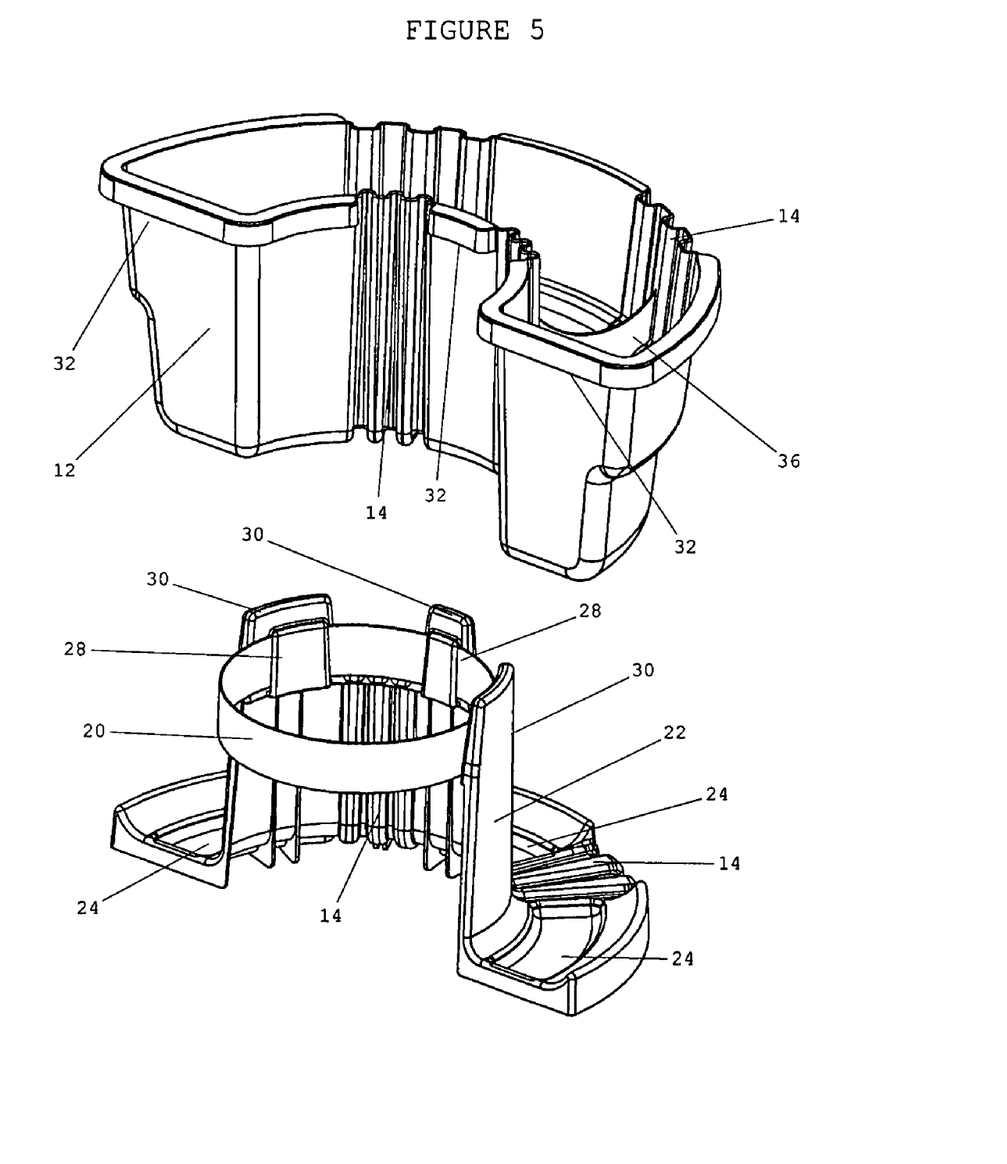
FIG. 5 is a rear perspective view of a semi-circular flexible flower box and semi-circular flexible flower box mounting shelf.

FIG. 5 is a rear perspective view of a semi-circular flexible flower box 12 and semi-circular flexible mounting shelf 22 shown in FIG. 1 and FIG. 3 respectively. This combined view shows how the flower box 12 shown in FIG. 1 and mounting shelf 22 shown in FIG. 3 come together and are joined as one unit. On the inside or backside of the flower box 12 shown in FIG. 2 is a column receptor 32. Each column receptor 32 shown in FIG. 2 is aligned with each support column 30 on the mounting shelf 22 both shown in FIG. 3. The flower box 12 shown in FIG. 2 is mounted atop the mounting shelf 22 shown in FIG. 3 in such a way as each support column 30 captures each column receptor 32 thus allowing both the flower box 12 shown in FIG. 2 and the mounting shelf 22 shown in FIG. 3 to connect to each other safely and securely.

Figure 6:
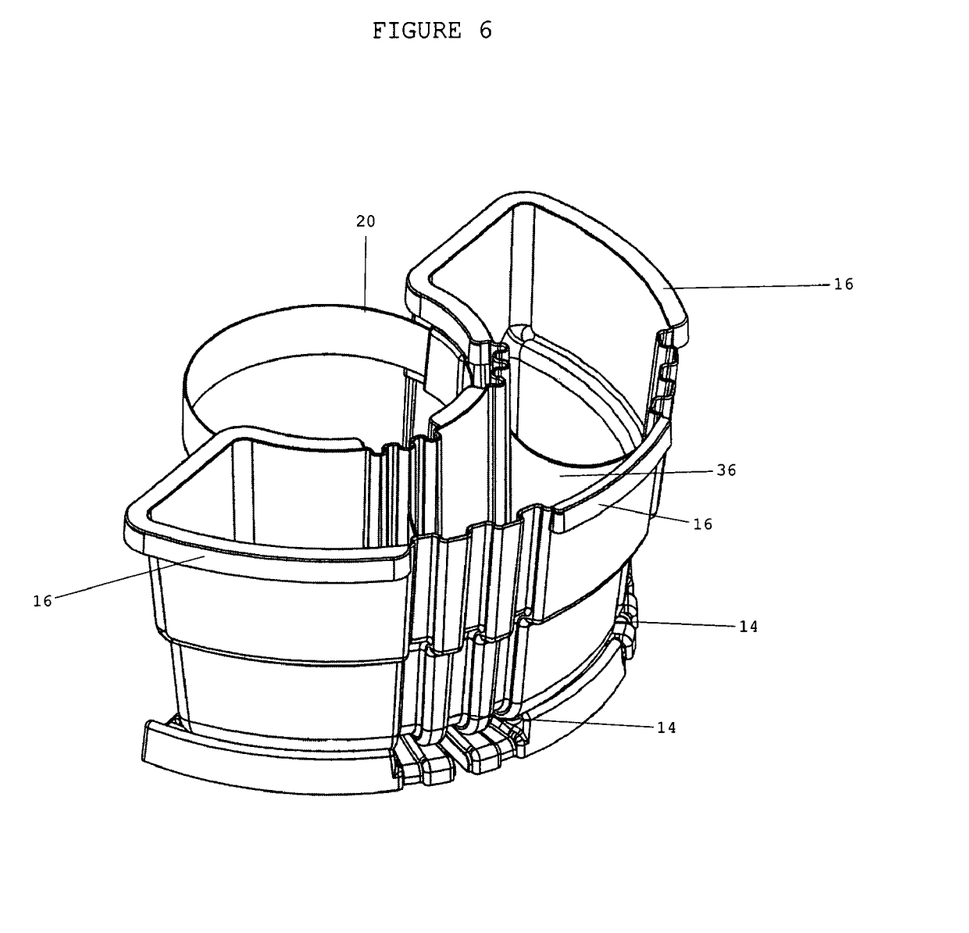
FIG. 6 is a front perspective combined view of a semi-circular flexible flower box and semi-circular flexible flower box mounting shelf.

FIG. 6 is a front perspective combined view of a semi-circular flexible flower box 12 shown in FIG. 1 and semi-circular flexible mounting shelf 22 shown in FIG. 3. This combined view shows the semi-circular flexible flower box 12 and semi-circular flexible mounting shelf 22 nesting securely together in a completely installed configuration.

Figure 7:
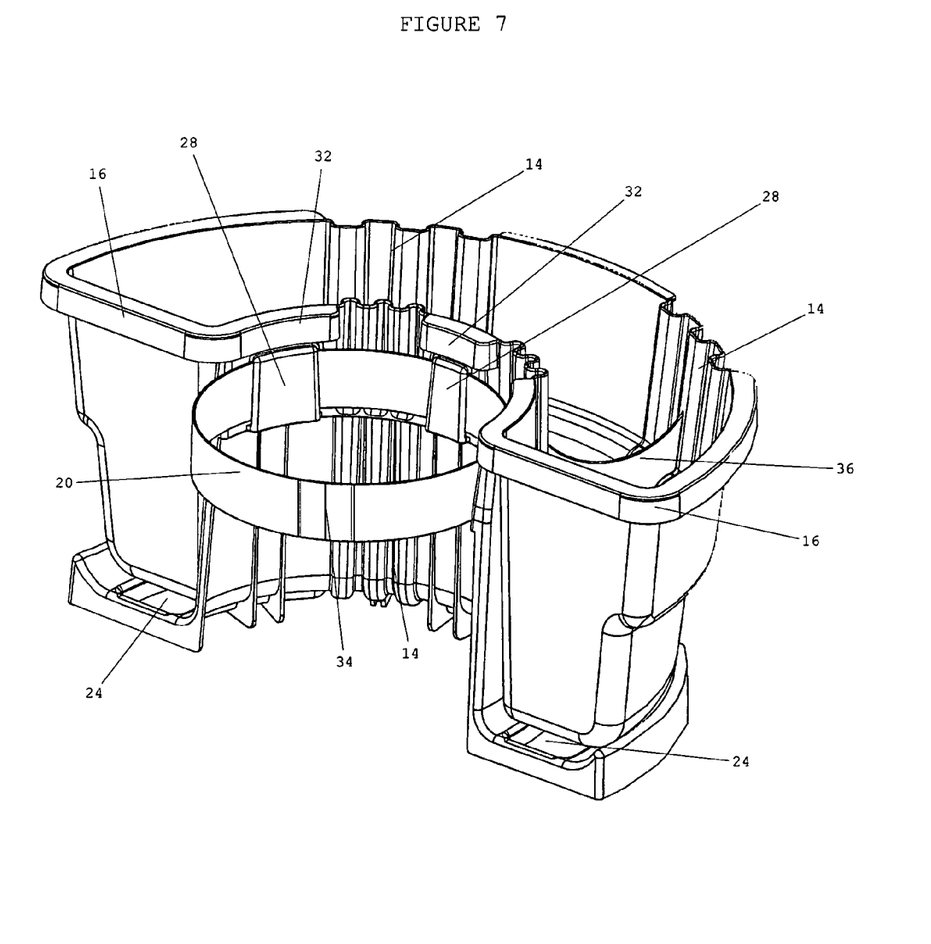
FIG. 7 is a rear perspective combined view of a semi-circular flexible flower box and semi-circular flexible flower box mounting shelf.

FIG. 7 is a rear perspective combined view of a semi-circular flexible flower box 12 shown in FIG. 1 and semi-circular flexible mounting shelf 22 shown in FIG. 3. This combined view shows the semi-circular flexible flower box 12 and semi-circular flexible mounting shelf 22 nesting securely together by means of support column 30 shown in FIG. 4 and column receptor 32 shown in FIG. 2 in a completely installed configuration.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A plant container for attachment to cylindrical objects, comprising:
    a semi-circular, flexible, UV resistant flower box, for a flexible semi-circular container;
    a flexible accordion pleat, for flexing, structurally connected to said flower box;
    a semi-circular, flexible, UV resistant mounting shelf, for mounting the semi-circular flow box, structurally connected to said accordion pleat, and securely connected to said flower box;
    a sturdy, snug attachment support slot, for an attachment strap;
    a support column, for mounting the semi-circular flexible flower box, structurally connected to said attachment support slot, and structurally connected to said mounting shelf; and
    a column receptor, for mounting the semi-circular flexible flower box, correspondingly connected to said support column, and structurally connected to said flower box.

2. The plant container as recited in claim 1, further comprising:
    a structural lip, for structural integrity.

3. The plant container as recited in claim 2, further comprising:
    a drainage hole, for drainage, detachably connected to a liquid retention bay, and structurally connected to said flower box.

4. The plant container as recited in claim 3, further comprising:
    a liquid retention bay, for excess drainage, detachably connected to said drainage hole, and structurally connected to said mounting shelf.

5. The plant container as recited in claim 2, further comprising:

a liquid retention bay, for excess drainage, detachably connected to a drainage hole, and structurally connected to said mounting shelf.

6. The plant container as recited in claim 1, further comprising:
a drainage hole, for drainage, structurally connected to said flower box.

7. The plant container as recited in claim 6, further comprising:
a liquid retention bay, for excess drainage, detachably connected to said drainage hole, and structurally connected to said mounting shelf.

8. The plant container as recited in claim 1, further comprising:
a liquid retention bay, for excess drainage, detachably connected to a drainage hole, and structurally connected to said mounting shelf.

9. A plant container for attachment to cylindrical objects, comprising:
a semi-circular, flexible, UV resistant flower box, for a flexible semi-circular container;
a flexible accordion pleat, for flexing, structurally connected to said flower box;
a structural lip, for structural integrity;
a drainage hole, for drainage, structurally connected to said flower box;
a semi-circular, flexible, UV resistant mounting shelf, for mounting the semi-circular flower box, structurally connected to said accordion pleat, and securely connected to said flower box;
a liquid retention bay, for excess drainage, structurally connected to said mounting shelf, and detachably connected to said drainage hole;
a sturdy, snug attachment support slot, for an attachment strap;
a support column, for mounting the semi-circular flexible flower box, structurally connected to said attachment support slot, and structurally connected to said mounting shelf; and
a column receptor, for mounting the semi-circular flexible flower box, correspondingly connected to said support column, and structurally connected to said flower box.

* * * * *